Mar. 13, 1923.
F. C. KERRIGAN
BRAKE FOR TOY COASTERS
Filed June 18, 1920
1,448,123
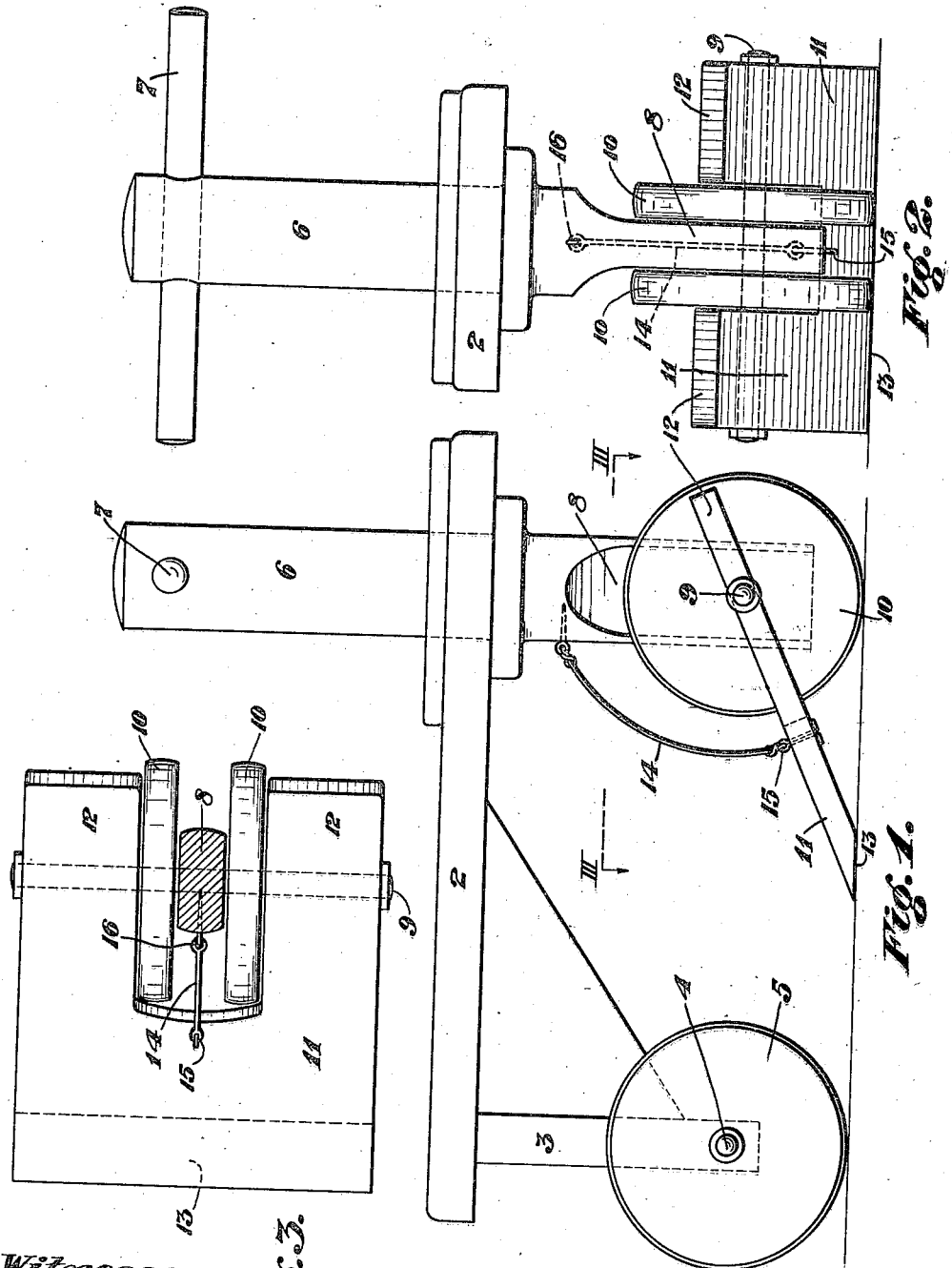
Witnesses:
Edwin Trueb
Lois Veneman
Inventor:
Francis C. Kerrigan
by C. M. Clarke
Atty.

Patented Mar. 13, 1923.

1,448,123

UNITED STATES PATENT OFFICE.

FRANCIS C. KERRIGAN, OF SWISSVALE, PENNSYLVANIA.

BRAKE FOR TOY COASTERS.

Application filed June 18, 1920. Serial No. 389,870.

*To all whom it may concern:*

Be it known that I, FRANCIS C. KERRIGAN, a citizen of the United States, residing at Swissvale, in the county of Allegheny and State of Pennsylvania, have invented certain new and useful Improvements in Brakes for Toy Coasters, of which the following is a specification.

My invention consists of an improvement in toys, and particularly those of the "Kiddie Kar" type for use by children. The improvement involved relates to brake mechanism, whereby the operator may check the progress of the device over the surface of the ground on down grades, and may also relieve the pressure in coasting, etc., by manipulation of one or both feet.

Referring to the drawings, showing one application of the invention as applied,

Fig. 1 is a partial view in side elevation of a car equipped with the brake;

Fig. 2 is a view in front elevation; and

Fig. 3 is a sectional plan view on the line III—III of Fig. 1.

The car to which the brake is applied comprises a main generally horizontal seat member 2 having a rear downwardly extending rigidly incorporated frame 3 provided with the rear axle 4 and rear wheels 5, the latter being considerably wider apart than the front wheels. A front steering post 6 is journaled in any suitable manner in the front portion of the seat member 2, as will be readily understood, and is provided at its upper portion with guiding handles 7, and its lower portion with an axle and brake mounting terminal 8. A front axle 9 extends transversely therethrough, and is provided at each side of the steering post terminal 8 with front wheels 10, one at each side of the post terminal and set somewhat closely together so as to operate practically as a single wheel.

The present improvement consists of a brake member 11 which may conveniently be made of a single piece of board, bifurcated at its front middle portion as shown, for clearance of the steering post terminal 8 and wheels 10, and is pivotally mounted at each outer side thereof by the remaining portion of its entire width upon the axle 9. The front end portions 12 of the brake extend forwardly beyond the pivotal mounting a sufficient distance to provide ample leverage for lifting the rear portion of the brake free from the surface of the ground. Such rear surface, of substantially uniform width throughout, is beveled or chamfered at its rear under portion, as indicated at 13, to conform to the general level of the ground, and is of considerable contacting area, due to the chamfered cut off end.

The brake member is normally retained in position by a supporting wire 14 connected at 15 to the brake member, and at 16 to the rear portion of the steering post 6. Said wire support is curved, as shown, rearwardly, somewhat conforming to the general contour of the front wheels 10, and is sufficiently stiff so that it will retract by its own resiliency to either thrust the rear contacting portion downwardly to normal position after being elevated by exerted leverage on front extensions 12, or to raise the rear portion to its usual normal position upon released pressure downwardly in braking.

The construction and operation of the device will be readily understood and appreciated from the foregoing description. The operator may press downwardly upon one or both side portions of the brake member 11, by using one or both feet, to arrest the momentum of the car. Likewise, the rear contacting portion of the brake may be easily elevated away from contact by downward pressure upon one or both forwardly extending portions 12, by using one or both feet. These portions 11 and 12 in this manner provide, by their upper surfaces, foot bearing treadles for either pressure or release. The resiliency or stiffness of the wire 14 may be easily utilized to exert any desired downward pressure by the brake portion, or to hold the device free from contact, by using wire of proper gauge and stiffness, or the operator himself may control the effect upon the brake by either additional bending or straightening of the wire member, to suit the desired conditions.

The improved brake mechanism may be applied to toys of the particular class disclosed, or may be adapted to other similar devices, and may be also changed or varied in detail construction, mounting, or otherwise, to adapt it to any particular use, but all such changes are to be considered as within the scope of the following claims.

What I claim is:

1. In combination with a wheeled vehicle having an axle member, a braking board pivotally mounted on the axle having a rear lower ground engaging portion and an upper treadle surface, a front lifting lever and treadle portion, and a bowed spring connected to the rear portion and to the vehicle.

2. A coasting car having rear supporting wheels and a front steering post having one or more supporting wheels and a front axle therefor, and a braking board pivoted on the front axle at each side of the steering post and extending backwardly and forwardly therefrom.

3. A coasting car having rear supporting wheels and a front steering post having one or more supporting wheels and a front axle therefor, and a braking board pivoted on the front axle at each side of the steering post extending backwardly and forwardly therefrom and having a supporting spring member.

4. A coasting car having rear supporting wheels and a front steering post having one or more supporting wheels and a front axle therefor, and a braking board pivoted on the front axle at each side of the steering post extending backwardly and forwardly therefrom and having a supporting wire attached to the braking-board and steering post respectively.

5. In combination with a toy coasting car having a front steering post provided with an axle and a pair of supporting wheels; a braking board having a middle clearance portion and pivotally mounted on the axle at each side of the wheels extending backwardly and terminating in a chamfered ground-engaging portion and also extending forwardly of the axle providing a lifting lever portion.

6. In combination with a toy coasting car having a front steering post provided with an axle and a pair of supporting wheels; a braking board having a middle clearance portion and pivotally mounted on the axle at each side of the wheels extending backwardly and terminating in a chamfered ground-engaging portion and also extending forwardly of the axle providing a lifting lever portion, and a curved wire secured by one end to the rear middle portion of the braking board and by the other end to the steering post.

In testimony whereof I hereunto affix my signature.

FRANCIS C. KERRIGAN.